United States Patent
Radkowski et al.

(10) Patent No.: US 8,869,234 B2
(45) Date of Patent: Oct. 21, 2014

(54) SYSTEM AND METHOD FOR POLICY BASED PRIVILEGED USER ACCESS MANAGEMENT

(75) Inventors: John Christopher Radkowski, Los Altos Hills, CA (US); Swetta Singh, Saratogo, CA (US)

(73) Assignee: SAP AG, Walldorf (DE)

( * ) Notice: Subject to any disclaimer, the term of this patent is extended or adjusted under 35 U.S.C. 154(b) by 371 days.

(21) Appl. No.: 13/463,160

(22) Filed: May 3, 2012

(65) Prior Publication Data

US 2013/0298186 A1 Nov. 7, 2013

(51) Int. Cl.
*H04L 29/06* (2006.01)

(52) U.S. Cl.
USPC ............ 726/1; 726/2; 726/3; 726/4; 726/6; 726/26; 726/5; 726/7; 726/8

(58) Field of Classification Search
CPC ....... H04L 63/20; H04L 63/101; H04L 63/12; H04L 63/0263; H04L 63/105; H04L 47/808; G06F 21/31; G06F 21/62; G06F 21/6218; G06F 2221/2145; G07C 9/00031
USPC ............................ 726/1, 4, 3, 2, 6, 26, 5, 7, 8
See application file for complete search history.

(56) References Cited

U.S. PATENT DOCUMENTS

| | | | |
|---|---|---|---|
| 2007/0150934 A1* | 6/2007 | Fiszman et al. | 726/1 |
| 2010/0074124 A1* | 3/2010 | Peterman et al. | 370/252 |
| 2010/0115598 A1* | 5/2010 | Barriga et al. | 726/8 |
| 2011/0247059 A1* | 10/2011 | Anderson et al. | 726/6 |

OTHER PUBLICATIONS

Oracle(Nov. 2011). System Administration Guide: Security Services. Part No. 821-1456-02. Retrieved from: http://docs.oracle.com/cd/E19963-01/pdf/821-1456.pdf.*
SAP-Basis & SAP-Security Tips n Tricks & Info, http://sap-basis-security.blogspot.com/2008/09/difference-between-sapall-and-sapnew.html Sep. 15, 2008.
System Administration Guide: Security Services, Oracle, Chapter 8, pp. 145-162. Nov. 2011.

* cited by examiner

*Primary Examiner* — Brian Shaw
(74) *Attorney, Agent, or Firm* — Fountainhead Law Group, PC

(57) ABSTRACT

Embodiments dynamically manage privileged access to a computer system according to policies enforced by rule engine. User input to the rule engine may determine an extent of system access, as well as other features such as intensity of user activity logging (including logging supplemental to a system activity log). Certain embodiments may provide access based upon user selection of a pre-configured ID at a dashboard, while other embodiments may rely upon direct user input to the rule engine to generate an ID at a policy enforcement point. Embodiments of methods and apparatuses may be particularly useful in granting and/or logging broad temporary access rights allowed based upon emergency conditions.

20 Claims, 7 Drawing Sheets

SYSTEM AND METHOD FOR POLICY BASED PRIVILEGED USER ACCESS MANAGEMENT

BACKGROUND

The present invention relates to schemes for user access to computer systems, and in particular to systems and methods for policy based privileged user access management.

Unless otherwise indicated herein, the approaches described in this section are not prior art to the claims in this application and are not admitted to be prior art by inclusion in this section.

For reasons relating to auditing, security, and compliance, organizations need to monitor access to critical business systems. Internal auditing typically requires that activities performed by system administrators or privileged users be monitored and reviewed. Accordingly, security or IT departments may strictly control access to sensitive areas. Moreover, compliance requirements may limit access to types of data for privacy, export control, and other reasons.

At the same time, however, businesses seek to operate with the greatest flexibility possible. For example it may be desirable to grant temporary access to business systems in order to allow the performance of emergency activities.

As applications evolve to support web and mobile access, conventional mechanisms to proxy authentication and monitor activity may no longer be sufficiently flexible to accommodate user needs. Additionally, the types of scenarios supported by emergency access systems for databases and operating systems may tend to focus on user management, rather than on end-to-end (emergency) scenarios including access and activity monitoring.

Thus, there is a need for a common approach allowing customers emergency access across various types of applications and systems supporting temporary/emergency access scenarios. Embodiments address these and other issues by providing systems and methods for policy based privileged user access management.

SUMMARY

Embodiments dynamically manage privileged access to a computer system according to policies enforced by rule engine. User input to the rule engine may determine an extent of system access, as well as other features such as intensity of user activity logging (including logging supplemental to a system activity log). Certain embodiments may provide access based upon user selection of a pre-configured ID at a dashboard, while other embodiments may rely upon direct user input to the rule engine to generate an ID at a policy enforcement point. Embodiments of methods and apparatuses may be particularly useful in granting and/or logging broad temporary access rights allowed based upon emergency conditions.

An embodiment of a computer implemented method comprises providing a Policy Enforcement Point (PEP) comprising a rule engine, providing to the (PEP), an identification (ID) to gain access to a first target system or application, and creating an authentication assertion of the ID. In response to receipt of the authentication assertion, the first system or application is caused to invoke the PEP such that the rule engine grants a user access to the first system or application according to a parameter determined by a policy. The parameter may comprise a logging level of activity of the user that is recorded in a first activity log supplemental to a second activity log of the first system or application.

An embodiment of a non-transitory computer readable storage medium embodies a computer program for performing a method comprising providing a Policy Enforcement Point (PEP) comprising a rule engine, providing to the (PEP), an identification (ID) to gain access to a first target system or application, and creating an authentication assertion of the ID. In response to receipt of the authentication assertion, the first system or application is caused to invoke the PEP such that the rule engine grants a user access to the first system or application according to a parameter determined by a policy. The parameter may comprise a logging level of activity of the user that is recorded in a first activity log supplemental to a second activity log of the first system or application.

An embodiment of a computer system comprises one or more computer processors and a non-transitory computer readable storage medium. The non-transitory computer readable storage medium comprises instructions for controlling the one or more computer processors to be operable to provide a Policy Enforcement Point (PEP) comprising a rule engine, provide to the (PEP), an identification (ID) to gain access to a first target system or application, and create an authentication assertion of the ID. In response to receipt of the authentication assertion, the first system or application is caused to invoke the PEP such that the rule engine grants a user access to the first system or application according to a parameter determined by a policy. The parameter may comprise a logging level of activity of the user that is recorded in a first activity log supplemental to a second activity log of the first system or application.

In some embodiments, access may be restricted by time and/or by portions of the first system or application available to the user.

According to certain embodiments, the ID comprises a pre-configured ID selected by the user from a list on a dashboard.

Particular embodiments may further comprise causing the PEP to dynamically select the ID in response to a user input to the rule engine.

In certain embodiments, the input may comprise a user response to a question posed by the PEP.

According to some embodiments, the PEP is in communication with a second target system or application, and the ID is specific to the first target system or application.

In particular embodiments the authentication assertion is federated across the first target system or application and the second target system or application.

The following detailed description and accompanying drawings provide a better understanding of the nature of particular embodiments.

BRIEF DESCRIPTION OF THE DRAWINGS

FIG. 2A is a simplified flow diagram showing a method of operation of the system of FIG. 2.

DETAILED DESCRIPTION

Described herein are systems and techniques for policy based privileged user access management. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
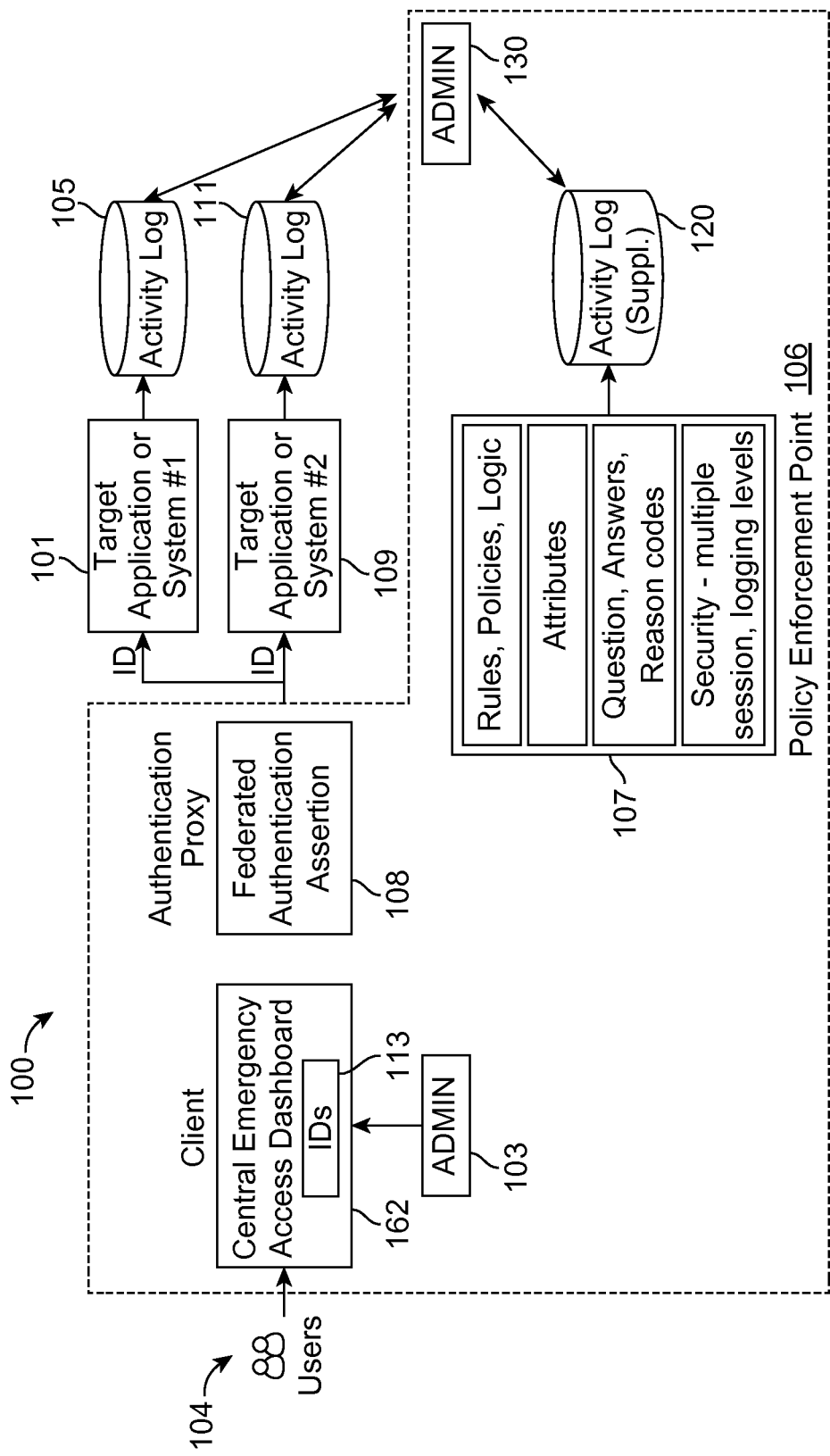
FIG. 1 is a simplified block diagram illustrating a system according to an embodiment.

Embodiments allow centralized management of privileged user access across different types of systems and applications. FIG. 1 shows a simplified schematic view of an embodiment an access management scheme 100 for a first target application or system 101 which includes a corresponding system activity log 105, and a second, different target application or system 109 which includes a corresponding system activity log 111.

In particular, privileged user sessions may be initiated from a common landing page 102. The common landing page may be established and administered through certain administrative processes 103, as is further discussed below in connection with FIG. 6.

In certain embodiments, this common landing page 102 may provide an end user 104 with access a list 113 of pre-configured IDs for corresponding applications/systems that can be used to launch an emergency access session. Such an embodiment is described in detail below in connection with FIGS. 2-2A. By authenticating to the particular application/system, a link between the end user and temporary emergency access ID is maintained.

Certain embodiments may apply federation technologies. Such embodiments leverage the underlying authorization functions within different applications/systems, in order to provide temporary monitored access to privileged accounts across enterprise landscapes. The embodiment of FIG. 1 thus includes a federated authentication feature 108 that allows an emergency access ID to be used to access the relevant application or system for a temporary session.

A federated authentication feature according to embodiments, may support several protocols required to implement the type of authentication called for by the target system(s). These protocols may include federation protocols such as Security Assertions Markup Language (SAML), the OAuth™ open standard for authorization, as well as other mechanisms including Single Sign On (SSO) logon tickets, HTTP cookies, tokens, user names, passwords, certificates, etc. that can be used alone or in combination to establish a session with target application(s).

According to certain embodiments, the particular type of authentication mechanism employed may be dynamically determined through a negotiation with the target application. In some embodiments, the authentication mechanism may be based on a pre-configured setting using the emergency access role or ID.

Embodiments may include a policy enforcement point (PEP) 106 component employing a rule engine 107, that is responsible for applying policies that determine parameters for the activity session. Various embodiments may allow functionalities that include but not limited to policy enabled authentication, authorization, session parameter setting, and audit tracking.

One particular example of a system parameter that may be determined by a rule engine of a PEP, is the specific type of activity information which is logged by the target application/system, and/or which is logged by the activity management scheme (e.g. in a supplemental activity log). Such activity logging ensures that details of user activity are captured and able to be routed for review and approval.

Particular embodiments may provide for creation of a separate activity log 120 by the PEP, to be associated with the emergency ID and an end user ID for review. This supplemental activity log supplements an existing activity log (e.g. 105 or 111) of the target system. This PEP activity log may include details about each action, while the system activity log may include other relevant transaction details. To ensure that correct activity information is logged and reviewed, the session can be tagged with the emergency access ID.

The policy enforcement point component may support scenarios including dynamic assignment in which user input does not take the form of selection of a pre-configured ID. Particular embodiments can be used to support access to a target system through a dashboard that supports the dynamic assignment process based on the context of the session request, with federated authentication of a generated ID occurring downstream. Such an embodiment is described below in connection with FIGS. 3-3A.

Embodiments may include dashboard(s) providing central reporting on emergency access activity and log review processes. According to an embodiment, the workflow may support the approval routing and administrative processes 130 for review of activity logging. This is described below in connection with FIG. 7.

As described herein, various embodiments may support access for privileged user accounts across multiple target systems and types of target systems. While each type of target application/system may have different capabilities for managing access for privileged accounts, embodiments addresses consistency and performance issues through a centralized approach that employs a PEP and rule engine operating independently of particular target technologies, applications, and systems.

Example

Dashboard Mode (Pre-Configured ID)

Figure 2:
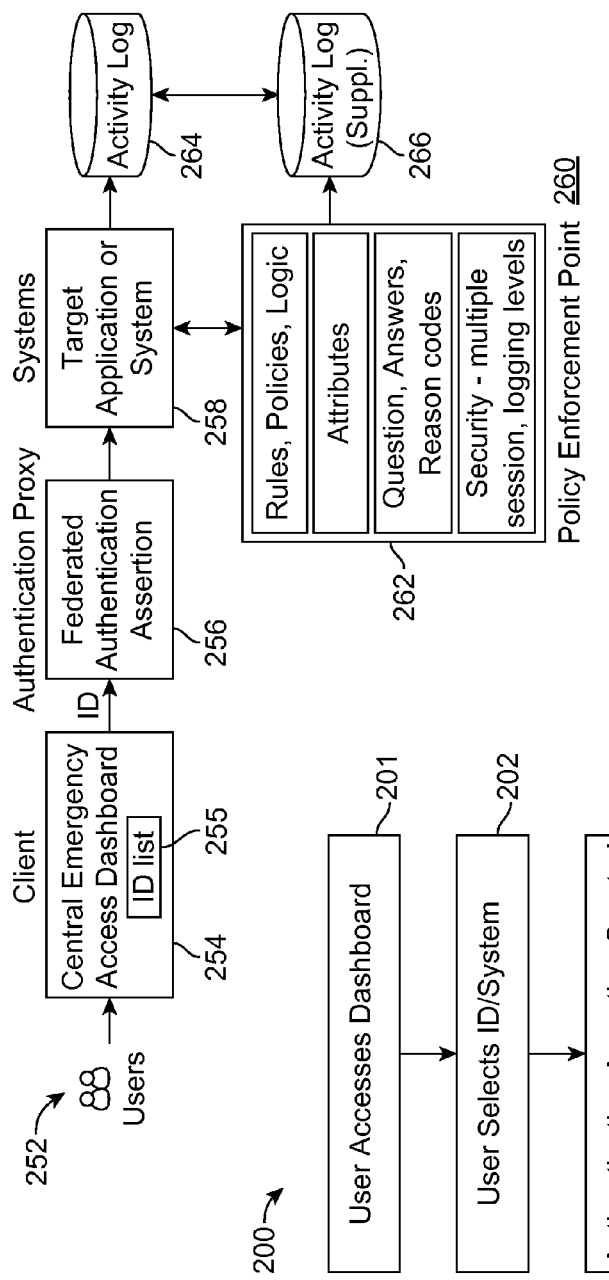
FIG. 2 is a simplified block diagram illustrating one embodiment of a system.

FIG. 2 is a simplified block diagram illustrating one embodiment of a system. FIG. 2A is a simplified flow diagram showing a method of operation of the system of FIG. 2.

The particular embodiment of FIGS. 2-2A employs an input to a rule engine in the form of a pre-configured ID that is selected by a user at a dashboard. That ID has already been subjected to federated authentication assertion.

Specifically, in a first step 201 of method 200, a user 252 authenticates to get access to emergency dashboard 254. This dashboard has a list 255 of pre-configured systems and IDs.

In a second step 202, the user selects an ID/system. This initiates a federated authentication assertion 256 in a third step 203.

In a fourth step 204, the target system 258 receives the authentication assertion and invokes the policy enforcement point 260. This policy enforcement point applies policy for the target system and the ID, utilizing a rule engine 262.

In particular, the PEP may provide questions to a user, and receive corresponding answers. This information may aid in providing the appropriate level of access to the user for the session.

The PEP can determine the appropriate session parameters either where a pre-configured ID is selected, or where an ID is dynamically determined. In certain embodiments, the PEP is able to evaluate the situational context of the session to apply configuration, logging, and security parameters dynamically. Dynamically determining the session, logging, and security parameters can permit the appropriate activity logging to occur during the emergency access scenarios, without affecting the system performance during typical operation.

A process to determine the session parameters may involve logical condition(s) based on attributes and other values associated with the user or system. These may be determined by a mathematical procedure, derived from questions and answers, provided by the computing device or system, based on events, incorporated in approval or review processes, and/or associated with levels of risk, etc.

In certain embodiments, the rule engine may also prompt the PEP to require the user to enter codes. An example of such a code is a reason code describing the nature of the situation necessitating system access.

At this time, the rule engine may evaluate attributes utilizing logical conditions. Such attributes include the identity of the user, the identity of an organization with which the user is affiliated, the device through which the user is attempting to gain access to the system, and/or the identity of the target system to which access is sought.

The rule engine may also apply security and other session parameters. Examples include but are not limited to authentication, time outs, the use of multiple sessions and other security constraints. Alerts to others (e.g. system administrators) may also be sent.

Logging levels are another type of session parameter which may be applied. The particular logging level for the existing system activity log 264, as well as for the supplemental activity log 266 of the PEP, may be configured at this time.

Embodiments may allow dynamic setting of the configuration of audit, configuration, event, activity, and system logging. The parameters that are available in the target system, may vary depending on the system and application design. Embodiments can integrate with system interfaces to change the levels or configuration in order to track user activity, data changes, configuration changes, and/or other changes related to activities performed by a user to restore operation, correct data, change configuration, perform system maintenance, etc.

Types of user activity may of course vary by system, along with capabilities to track user activity. In order to support consistent activity tracking, embodiments may incorporate multiple logging capabilities using the PEP as well as existing system audit, configuration, event, and activity logs.

The following presents a list of possible audit and activity logging levels which may be applied in various embodiments:
  date of user access;
  date and time of user access;
  date, time, and specific areas of the target system accessed;
  date, time, and every keystroke entered by the user.

Certain embodiments can include the ability to apply logging as necessary to track user activity and actions that include but are not limited to: turning on logging for specific tables or data sets within an application to track changes to values; and/or setting the level of logging within an application or system based upon a condition level. For example, condition levels may be classified according to the following:

| Level | Severity | Description |
|---|---|---|
| 0 | Emergency | System is unusable. |
| 1 | Alert | Action must be taken immediately. |
| 2 | Critical | Critical conditions. |
| 3 | Error | Error conditions. |
| 4 | Warning | Warning conditions. |
| 5 | Notice | Normal but significant condition. |
| 6 | Informational | Informational messages. |
| 7 | Debug | Debug-level messages. |

Embodiments may dynamically configure the type, actions, and format of activity information. Embodiments may configure the system to track specific events (e.g. security-related), and/or critical system indicators relevant to the type of emergency access session. Embodiments may monitor changes in configuration of the application to detect specific types of security vulnerabilities and other possible fraud scenarios.

In certain embodiments, a logging level parameter may specify a logging level that is available to a system activity log. In certain embodiments, a logging level parameter may specify a logging level not available to the system activity log, but which is performed based upon instructions provided by the PEP/rules engine of the access management scheme.

In a fifth step 205, the activity session is opened. User activities may be logged in the system activity log and by a supplemental activity log of the policy enforcement point.

Example

Dynamic Mode (No Pre-Configured ID)

Figure 3:
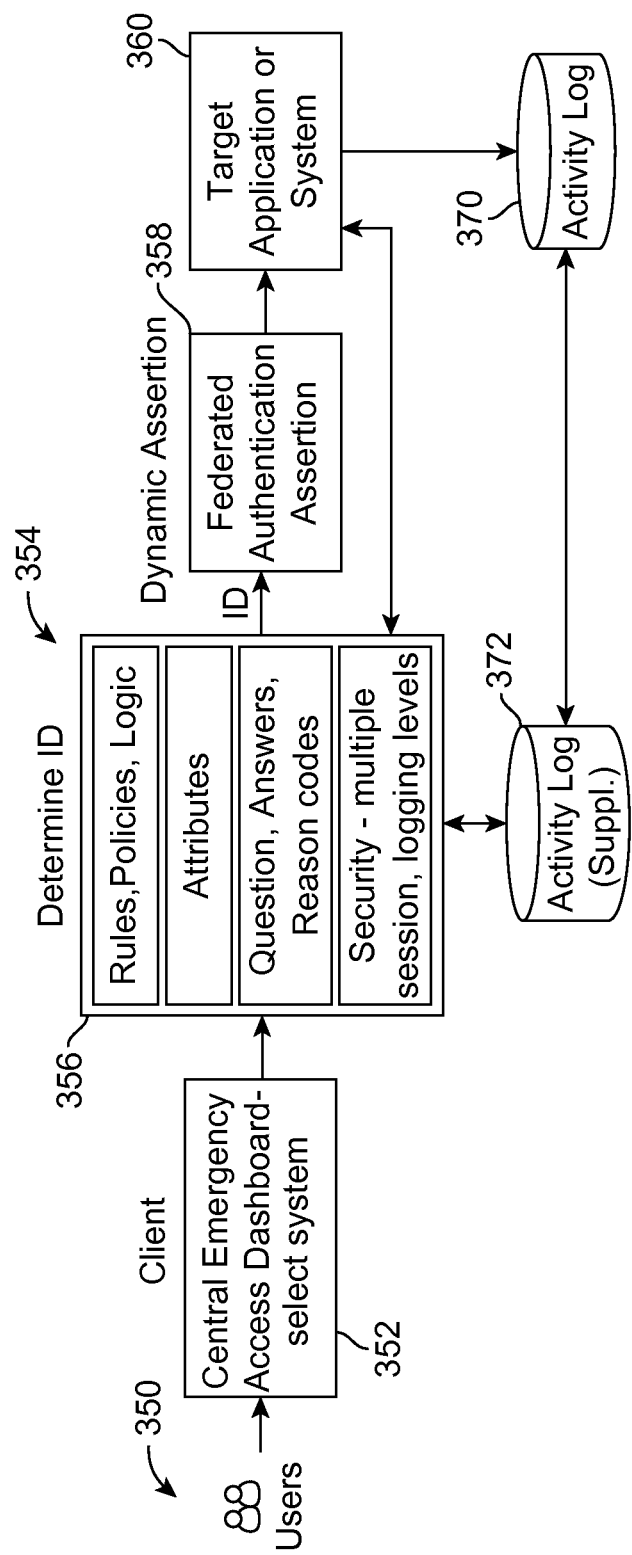
FIG. 3 is a simplified block diagram illustrating another embodiment of a system.
Figure 3A:
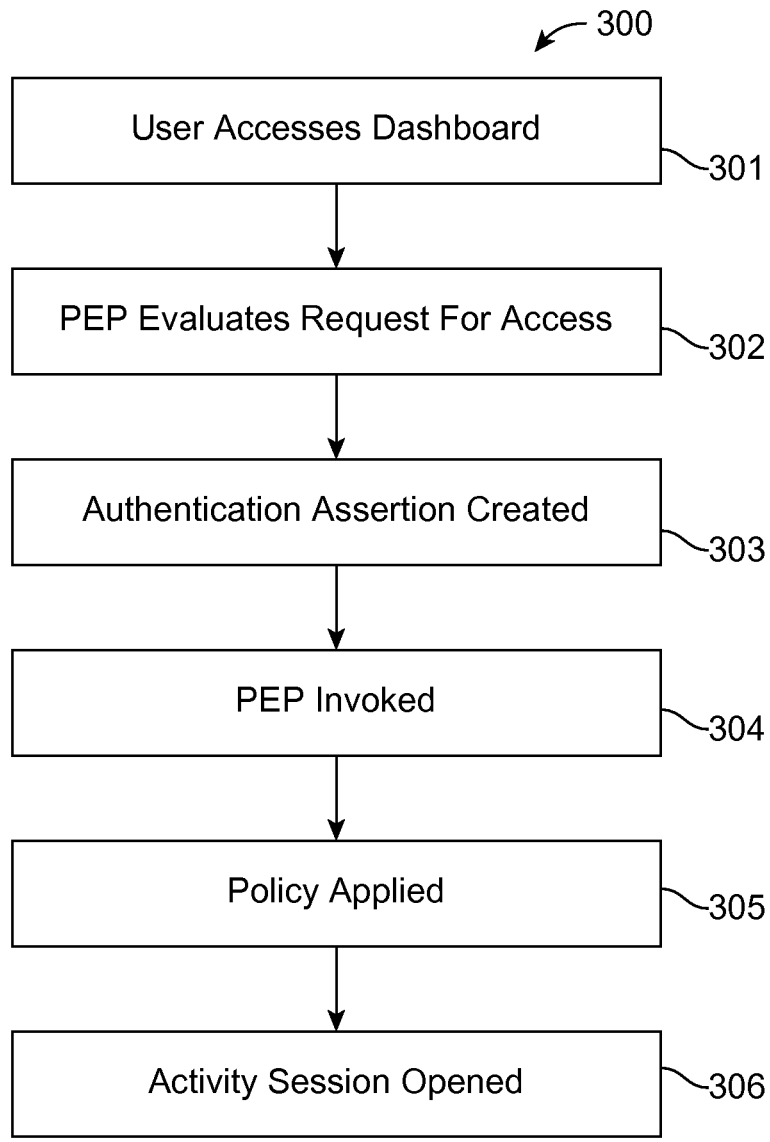
FIG. 3A is a simplified flow diagram showing a method of operation of the system of FIG. 3.

FIG. 3 is a simplified block diagram illustrating an alternative embodiment of a system. FIG. 3A is a simplified flow diagram showing a method of operation of the alternative system of FIG. 3.

The embodiment of FIGS. 3-3A employs a session ID dynamically generated based upon user input to a rule engine. The session ID is then subjected to federated authentication assertion.

According to this embodiment, the user authenticates to get access to emergency dashboard with list of pre-configured systems and IDs. Embodiments can operate with both a pre-configured emergency access ID, as well as in a mode where an appropriate ID is determined based on a set of questions and/or evaluation of a logical condition by rule engine. Thus in a first step 301 of method 300, the user 350 accesses the dashboard 352 to select a logical or physical system.

In a second step 302, the policy enforcement point 354 evaluates the request. The rule engine 356 dynamically determines the list of privileged IDs based on information such as questions/answers, end user ID, attributes, organization, device, context, prior activity information, and others.

In a third step 303, an authentication assertion 358 created based on the ID selected by the PEP. In a fourth step 304, the target system 360 receives the assertion and invokes the policy enforcement point.

In a fifth step 305, the policy enforcement point applies a policy for system and ID. This application of policy by the rules engine may include questions issued and answers/reason codes received from the user. User, organization, device, system, and/or other attributes may be evaluated by the rule engine using logical conditions. Security and other session parameters may be applied. Parameters include but are not limited to, authentication, time outs, alerts, and multiple session and other security constraints. A logging level parameter may be applied, and logging level configured.

In a sixth step 306, an (emergency) session is opened. Activities may be logged in both the target application/system activity log 370 and the supplemental activity log 372 of the policy enforcement point.

Example

Administration Scenarios

Administration scenarios for emergency access may include one or more of the following functions.

One function may be to provide an emergency access role or ID management. Specifically, emergency access roles and IDs may allow emergency users to access the features and data in the target system or application. These roles and IDs are specific to the target application. They may be incorporated into the authentication assertion in order to initiate an emergency access session.

A second function may be to provide user administration and assignment. Specifically, upon selecting and assigning a role to a user, access to the dashboard is available.

Figure 6:
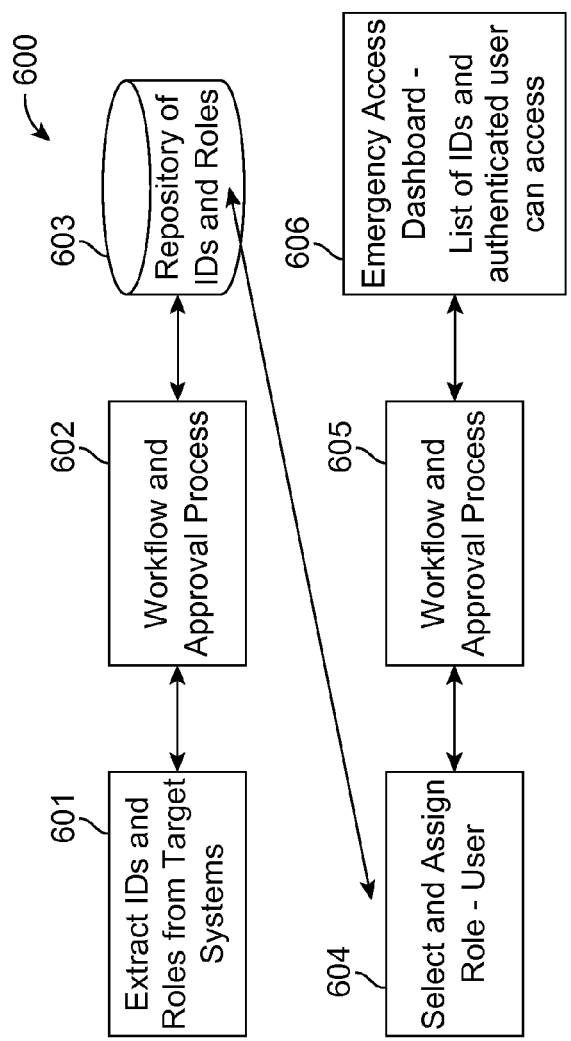
FIG. 6 is a simplified flow diagram of an administration scenario process flow according to an embodiment.

FIG. 6 is a simplified flow diagram of a process flow 600 according to an embodiment. The top row of FIG. 6 comprises steps of a process of administering emergency access roles and IDs. In a first step 601, IDs and roles are extracted from target systems. Following a workflow and approval process 602, in step 603 IDs and Roles are stored in a repository.

The second row of FIG. 6 shows steps for the assignment of users. Step 604 shows selection and assignment of roles to a user. Following a workflow and approval process 605, step 606 shows storing at the Emergency Access Dashboard, a list of IDs accessible to an authenticated user. The embodiment of the access management scheme outlined in FIGS. 2-2A then become available.

Figure 7:
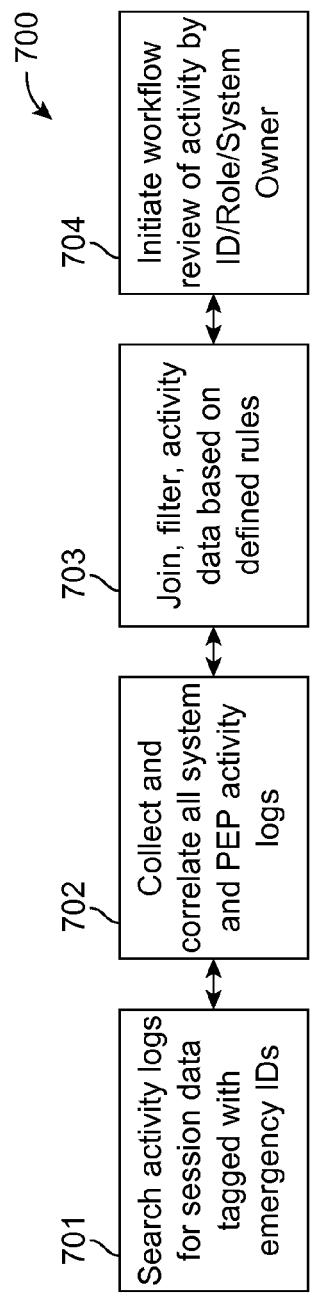
FIG. 7 is a simplified flow diagram showing review of activity log by system/role/or ID Owner.

Another administrative function may be to allow review of activity logs after or even during an access session that has been opened. FIG. 7 is a simplified flow diagram showing a process 700 of review of activity log by system/role/or ID Owner. In a first step 701, activity logs are searched for session data tagged with emergency IDs. In a second step 702, all system and PEP activity logs are collected and correlated. In a third step 703, activity data may be joined and filtered based on defined rules. In a fourth step 704, workflow review of activity may by ID/Role/System Owner may be initiated.

Figure 4:
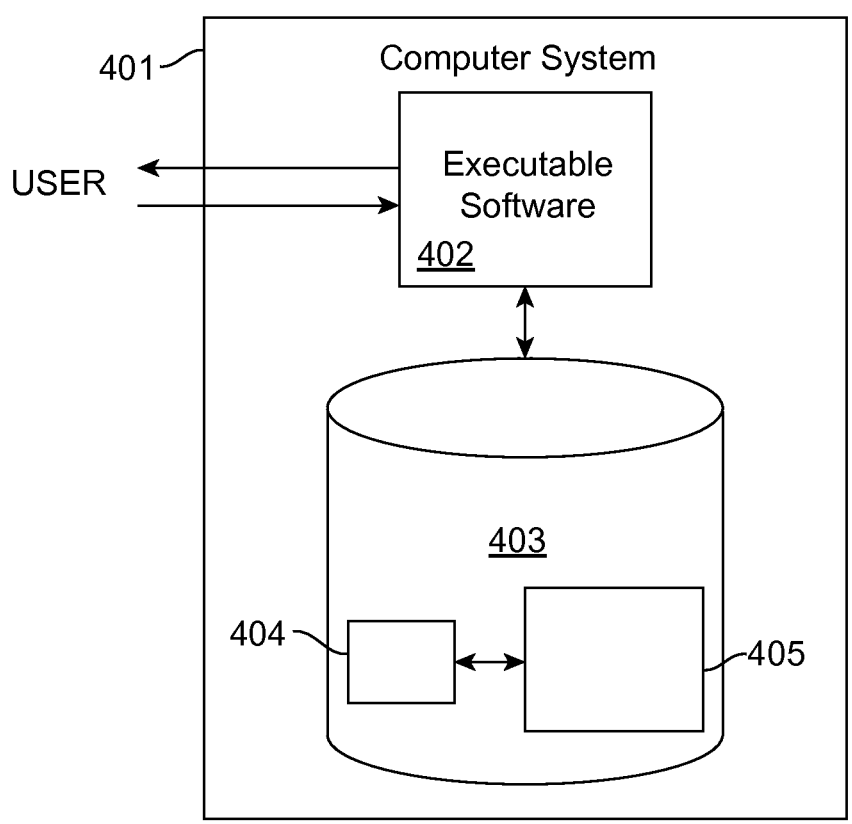
FIG. 4 illustrates hardware of a special purpose computing machine configured to perform policy based access management according to an embodiment.

FIG. 4 illustrates hardware of a special purpose computing machine configured to perform access management according to an embodiment. In particular, computer system 400 comprises a processor 402 that is in electronic communication with a non-transitory computer-readable storage medium 403. This computer-readable storage medium has stored thereon code 405 corresponding to a rule engine. Code 404 corresponds to an activity log (e.g. a supplemental activity log of a PEP) that may be generated.

Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
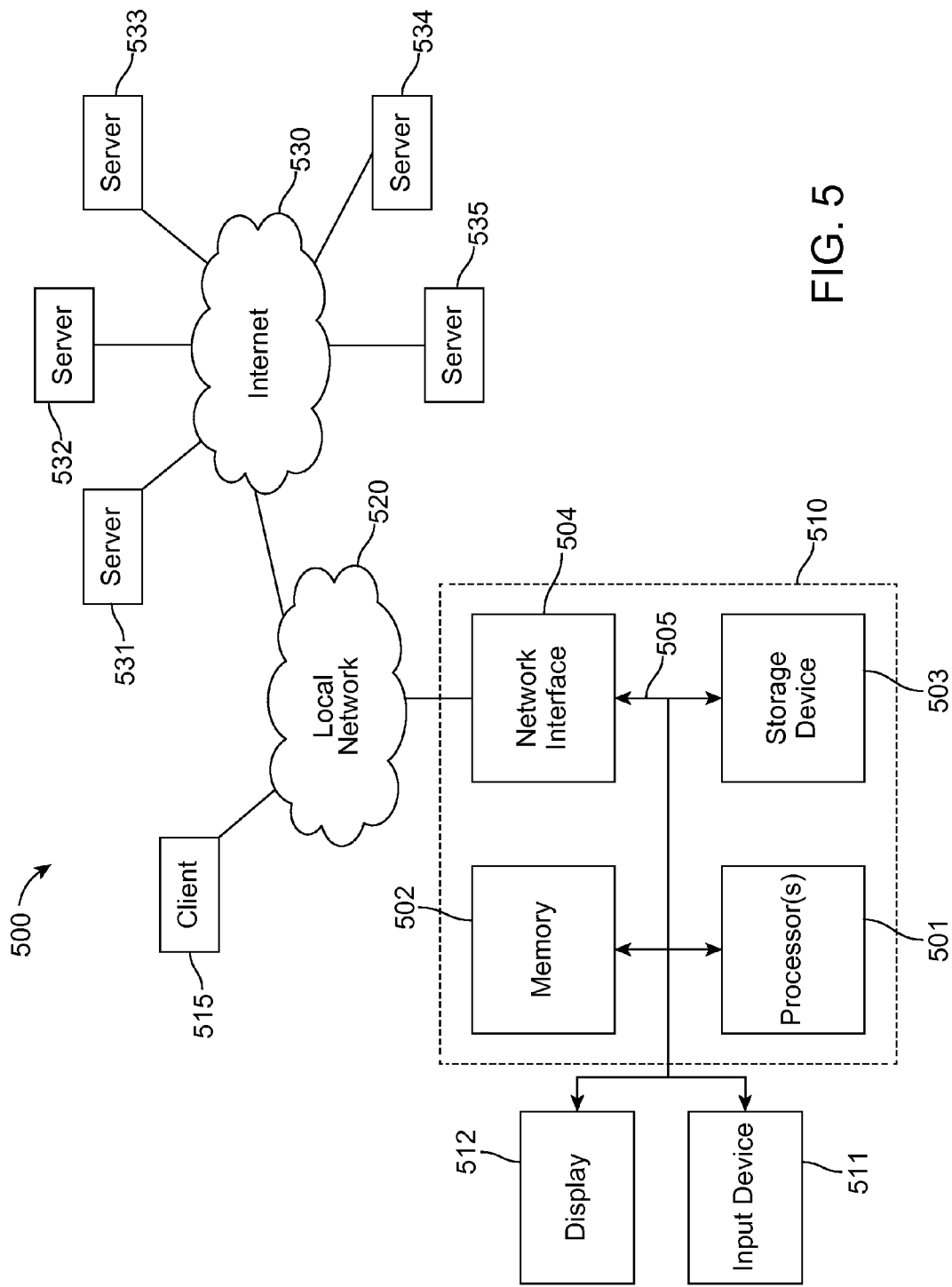
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 304 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

In conclusion, technology trends may call for organizations to deploy multiple types of systems/applications to manage and support business activities. Conventionally, each of those technologies employed different types of emergency/urgent access management schemes.

In order to satisfy business continuity, system security, and regulatory compliance considerations, embodiments as described herein accordingly provide organizations with a consistent solution for managing emergency and urgent access for privileged user accounts and monitoring and reviewing session activities. Embodiments provide emergency and urgent access management that delivers consistent processes across systems and applications, supported by logging activities facilitating a common activity review.

Moreover, certain embodiments may address performance issues related to activity logging (e.g. processing resources consumed by logging) through dynamic configuration of the logging levels of front end (system) logging and any supplemental logging, based on system authorization information. Combining system logs with supplemental authorization logs facilitates thorough tracking of user activities during access sessions.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method comprising:
   providing a Policy Enforcement Point (PEP) comprising a rule engine;
   causing the PEP to recognize an emergency based upon a condition level of a first target system or application;
   providing to the PEP, an identification (ID), that is specific to the first target system or application, to gain access to the first target system or application according to the condition level, wherein the provided identification is different than an identification to gain access to the first target system or application when there is no emergency based upon the condition level;
   creating an authentication assertion of the ID; and
   in response to receipt of the authentication assertion, causing the first target system or application to invoke the PEP such that the rule engine grants a user an emergency access session, tagged with the provided ID, to the first target system or application according to a parameter determined by a policy;
   wherein the parameter comprises a logging level of activity of the user in the emergency access session that is recorded in a first activity log supplemental to a second activity log of the first target system or application, wherein during the emergency access session the first activity log comprises session data tagged with the provided ID, the first activity log is available for review, and access to the second activity log is disrupted as a result of the condition level of the first target system or application.

2. A method as in claim 1 wherein the emergency access session is restricted by time and/or by portions of the first target system or application available to the user.

3. A method as in claim 1 wherein the ID comprises a pre-configured ID selected by the user from a list on a dashboard.

4. A method as in claim 1 further comprising causing the PEP to dynamically select the ID in response to an input by the user to the rule engine.

5. A method as in claim 4 wherein the input comprises the user response to a question posed by the PEP.

6. A method as in claim 1 wherein the PEP is in communication with a second target system or application, and the ID is specific to the first target system or application.

7. A method as in claim 6 wherein the authentication assertion is federated across the first target system or application and the second target system or application.

8. A non-transitory computer readable storage medium embodying a computer program for performing a method, said method comprising:
   providing a Policy Enforcement Point (PEP) comprising a rule engine;
   causing the PEP to recognize an emergency based upon a condition level of a first target system or application;
   providing to the PEP, an identification (ID), that is specific to the first target system or application, to gain access to the first target system or application according to the condition level, wherein the provided identification is different than an identification to gain access to the first target system or application when there is no emergency based upon the condition level;
   creating an authentication assertion of the ID; and
   in response to receipt of the authentication assertion, causing the first target system or application to invoke the PEP such that the rule engine grants a user an emergency access session, tagged with the provided ID, to the first target system or application according to a parameter determined by a policy;
   wherein the parameter comprises a logging level of activity of the user in the emergency access session that is recorded in a first activity log supplemental to a second activity log of the first target system or application, wherein during the emergency access session the first activity log comprises session data tagged with the provided ID, the first activity log is available for review, and access to the second activity log is disrupted as a result of the condition level of the first target system or application.

9. A non-transitory computer readable storage medium as in claim 8 wherein the emergency access session is restricted by time and/or by portions of the first target system or application available to the user.

10. A non-transitory computer readable storage medium as in claim 8 wherein the ID comprises a pre-configured ID selected by the user from a list on a dashboard.

11. A non-transitory computer readable storage medium as in claim 8 wherein the method further comprises causing the PEP to dynamically select the ID in response to an input by the user to the rule engine.

12. A non-transitory computer readable storage medium as in claim 11 wherein the input comprises the user response to a question posed by the PEP.

13. A non-transitory computer readable storage medium as in claim 8 wherein the PEP is in communication with a second target system or application, and the ID is specific to the first target system or application.

14. A non-transitory computer readable storage medium as in claim 8 wherein the authentication assertion is federated across the first target system or application and the second target system or application.

15. A computer system comprising:
   one or more computer processors; and
   a non-transitory computer readable storage medium comprising instructions for controlling the one or more computer processors to be operable to:
   provide a Policy Enforcement Point (PEP) comprising a rule engine;

cause the PEP to recognize an emergency based upon a condition level of a first target system or application;

provide to the PEP, an identification (ID), that is specific to the first target system or application, to gain access to the first target system or application according to the condition level, wherein the provided identification is different than an identification to gain access to the first target system or application when there is no emergency based upon the condition level;

create an authentication assertion of the ID; and in response to receipt of the authentication assertion, cause the first target system or application to invoke the PEP such that the rule engine grants a user an emergency access session, tagged with the provided ID, to the first target system or application according to a parameter determined by a policy;

wherein the parameter comprises a logging level of activity of the user in the emergency access session that is recorded in a first activity log supplemental to a second activity log of the first target system or application, wherein during the emergency access session the first activity log comprises session data tagged with the provided ID, the first activity log is available for review, and access to the second activity log is disrupted as a result of the condition level of the first target system or application.

16. A computer system as in claim 15 wherein the emergency access session is restricted by time and/or by portions of the first target system or application available to the user.

17. A computer system as in claim 15 wherein the ID comprises a pre-configured ID selected by the user from a list on a dashboard.

18. A computer system as in claim 15 further comprising causing the PEP to dynamically select the ID in response to an input by the user to the rule engine.

19. A computer system as in claim 18 wherein the input comprises the user response to a question posed by the PEP.

20. A computer system as in claim 15 wherein the PEP is in communication with a second target system or application, the ID is specific to the first target system or application, and the authentication assertion is federated across the first target system or application and the second target system or application.

* * * * *